United States Patent
Beymer

(10) Patent No.: US 9,867,397 B2
(45) Date of Patent: Jan. 16, 2018

(54) NICOTINE DELIVERY SYSTEM

(71) Applicant: Patrick Beymer, Zionsville, IN (US)

(72) Inventor: Patrick Beymer, Zionsville, IN (US)

( * ) Notice: Subject to any disclaimer, the term of this patent is extended or adjusted under 35 U.S.C. 154(b) by 137 days.

(21) Appl. No.: 14/992,068

(22) Filed: Jan. 11, 2016

(65) Prior Publication Data

US 2017/0196259 A1 Jul. 13, 2017

(51) Int. Cl.
*A24F 47/00* (2006.01)
*H02J 7/00* (2006.01)

(52) U.S. Cl.
CPC .......... *A24F 47/002* (2013.01); *H02J 7/0042* (2013.01)

(58) Field of Classification Search
CPC ..... A24F 47/002; A24F 47/008; A61M 15/00; A61M 16/0063; A61M 2209/086; A61K 9/0078
See application file for complete search history.

(56) References Cited

U.S. PATENT DOCUMENTS

| | | | |
|---|---|---|---|
| 4,953,572 A | 9/1990 | Rose et al. | |
| 5,022,587 A * | 6/1991 | Hochstein | G05D 16/2066 128/203.12 |
| D331,281 S | 11/1992 | Levine | |
| D383,838 S | 9/1997 | Solano | |
| 6,076,520 A * | 6/2000 | Cooper | A61M 16/0063 128/200.14 |
| 7,767,698 B2 | 8/2010 | Warchol et al. | |
| 8,127,772 B2 | 3/2012 | Montaser | |
| 2012/0291781 A1* | 11/2012 | Kaufmann | A61M 15/008 128/203.15 |
| 2012/0291791 A1 | 11/2012 | Pradeep | |
| 2014/0088044 A1 | 3/2014 | Rigas et al. | |
| 2016/0263342 A1* | 9/2016 | Polin | A61M 16/16 |

FOREIGN PATENT DOCUMENTS

WO   WO03101454   12/2003

* cited by examiner

*Primary Examiner* — Joseph S Del Sole
*Assistant Examiner* — Mohamed K Ahmed Ali

(57) ABSTRACT

A nicotine delivery system includes a nebulizer. The nebulizer includes a canister, a compressor and a hose extending between the canister and the compressor. The canister contains a liquid and the liquid comprises a nicotine solution. The canister includes a fogging unit. The fogging unit converts the liquid into a mist. Thus, the mist may be inhaled. The canister has an inhale port and an exhale port. Each of the inhale port and the exhale port is fluidly coupled to the canister. The inhale port may be sucked thereby facilitating the mist to be inhaled. A charging unit is provided. The compressor is selectively electrically coupled to the charging unit. Thus, the charging unit charges the compressor.

9 Claims, 5 Drawing Sheets

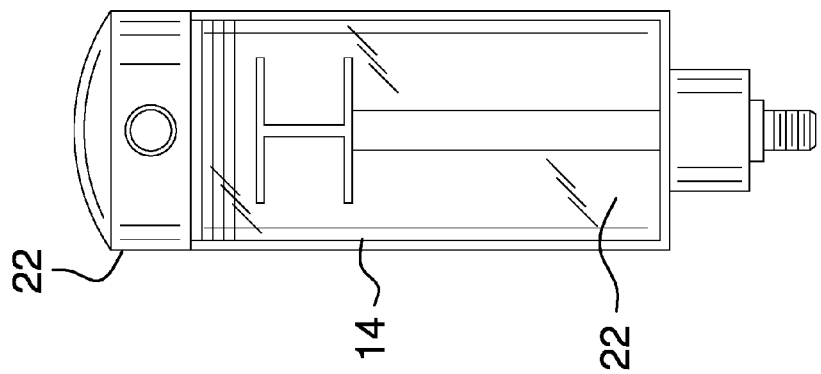
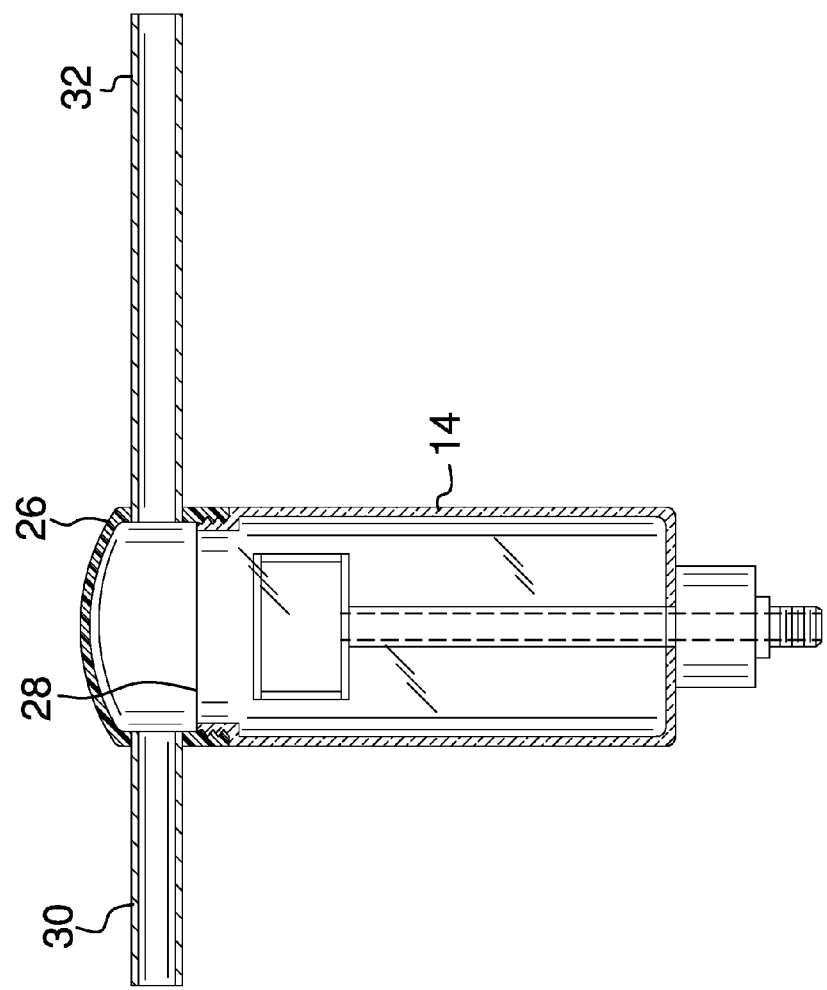

NICOTINE DELIVERY SYSTEM

BACKGROUND OF THE DISCLOSURE

Field of the Disclosure

The disclosure relates to nicotine deliver devices and more particularly pertains to a new nicotine delivery device for inhaling gaseous nicotine in a smoke free and flame free environment.

SUMMARY OF THE DISCLOSURE

An embodiment of the disclosure meets the needs presented above by generally comprising a nebulizer. The nebulizer includes a canister, a compressor and a hose extending between the canister and the compressor. The canister contains a liquid and the liquid comprises a nicotine solution. The canister includes a fogging unit. The fogging unit converts the liquid into a mist. Thus, the mist may be inhaled. The canister has an inhale port and an exhale port. Each of the inhale port and the exhale port is fluidly coupled to the canister. The inhale port may be sucked thereby facilitating the mist to be inhaled. A charging unit is provided. The compressor is selectively electrically coupled to the charging unit. Thus, the charging unit charges the compressor.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 3 is a cross sectional view taken along line 3-3 of FIG. 1 of an embodiment of the disclosure.

FIG. 4 is a right side view of an embodiment of the disclosure.

DESCRIPTION OF THE PREFERRED EMBODIMENT

Figure 1:
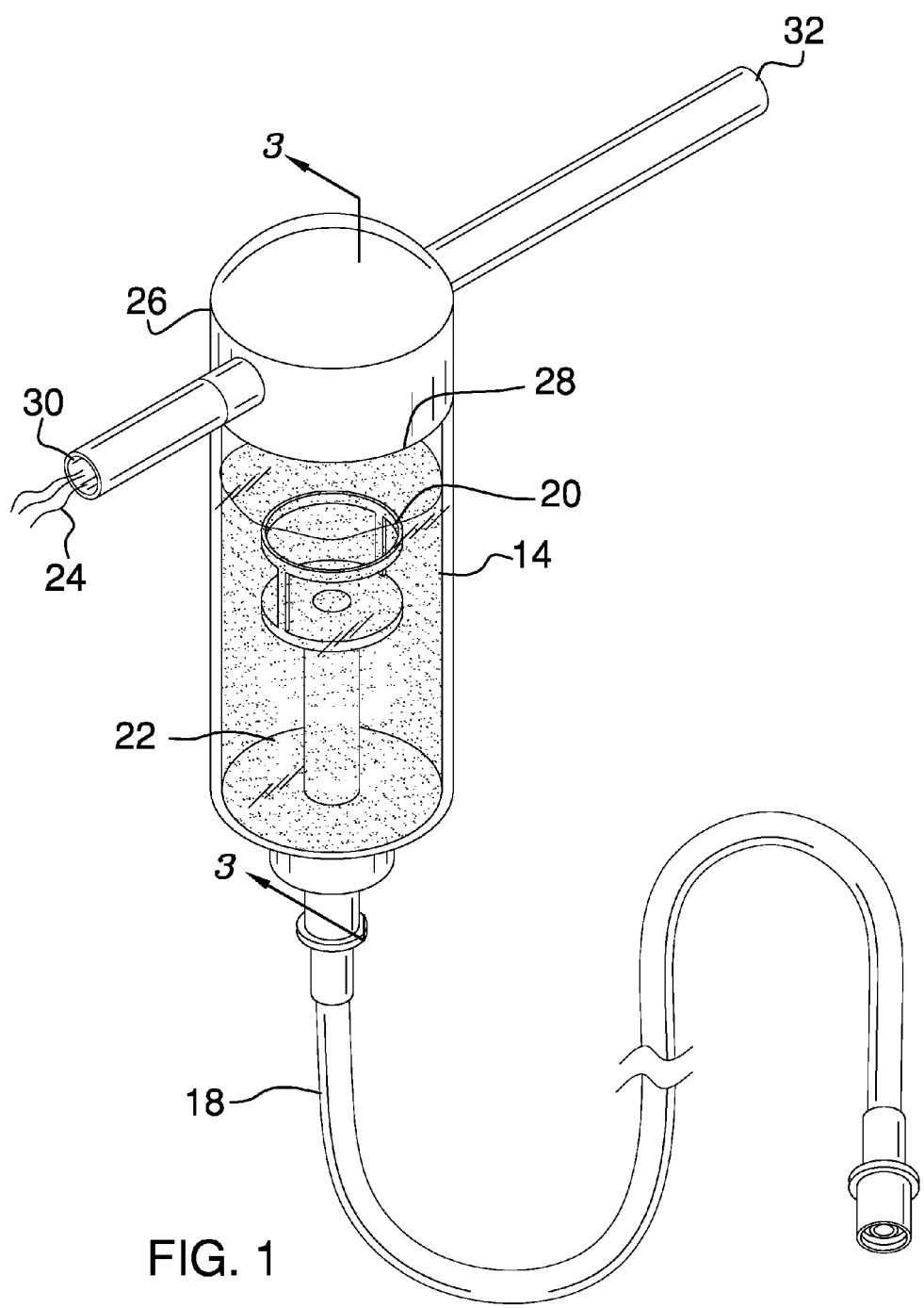
FIG. 1 is a perspective view of a nicotine delivery system according to an embodiment of the disclosure.
Figure 2:
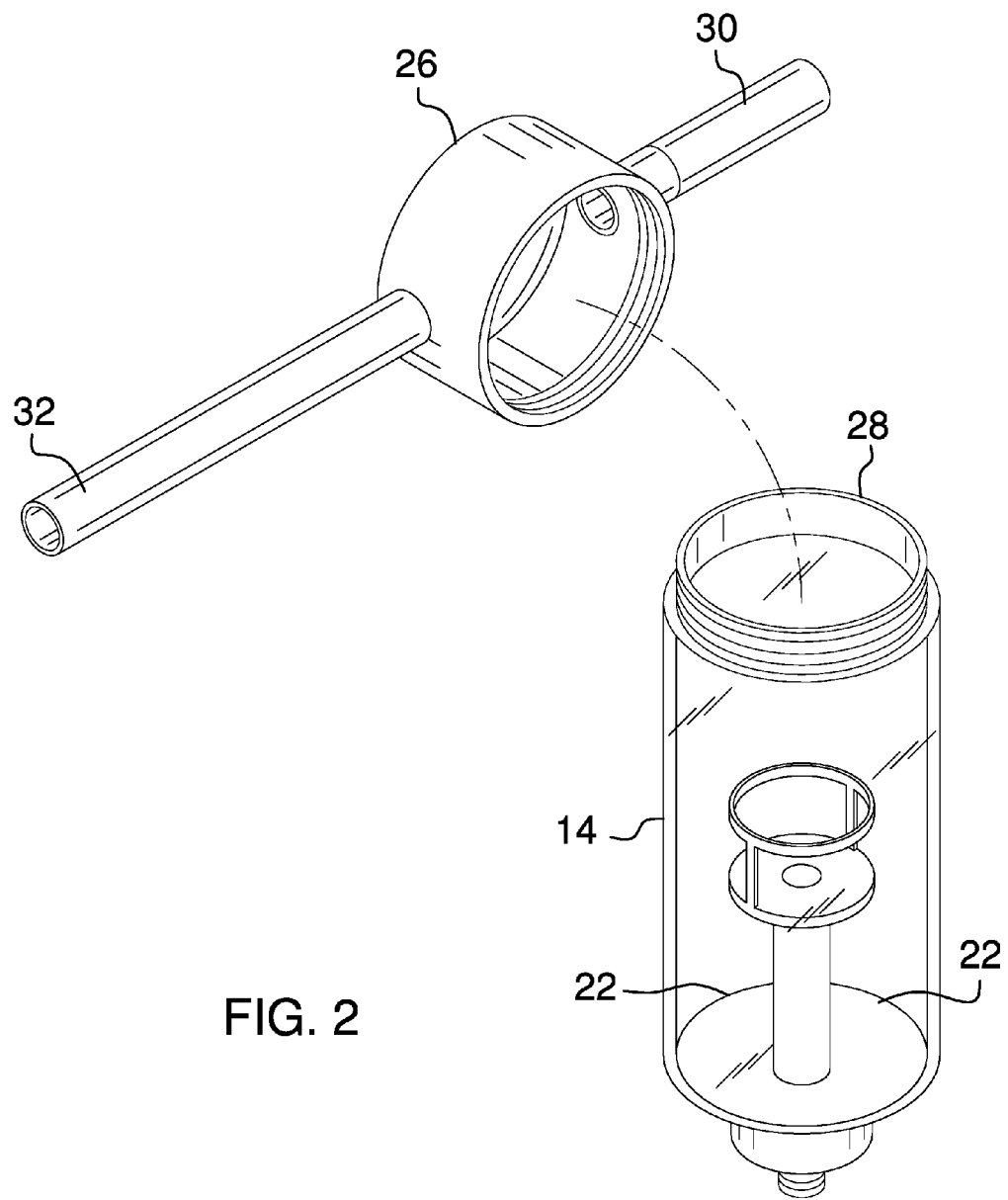
FIG. 2 is an exploded view of an embodiment of the disclosure.
Figure 5:
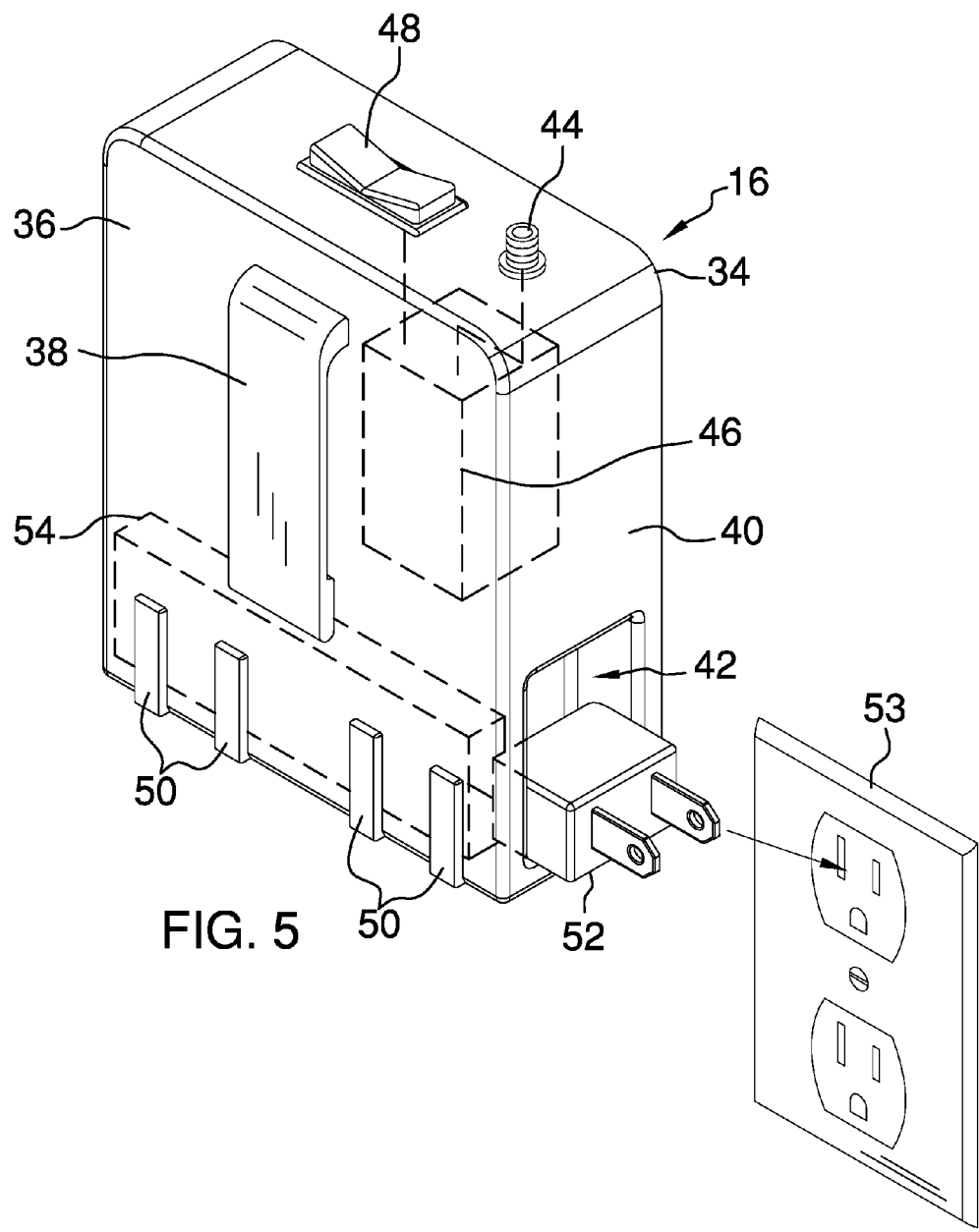
FIG. 5 is a perspective view of a compressor of an embodiment of the disclosure.
Figure 6:
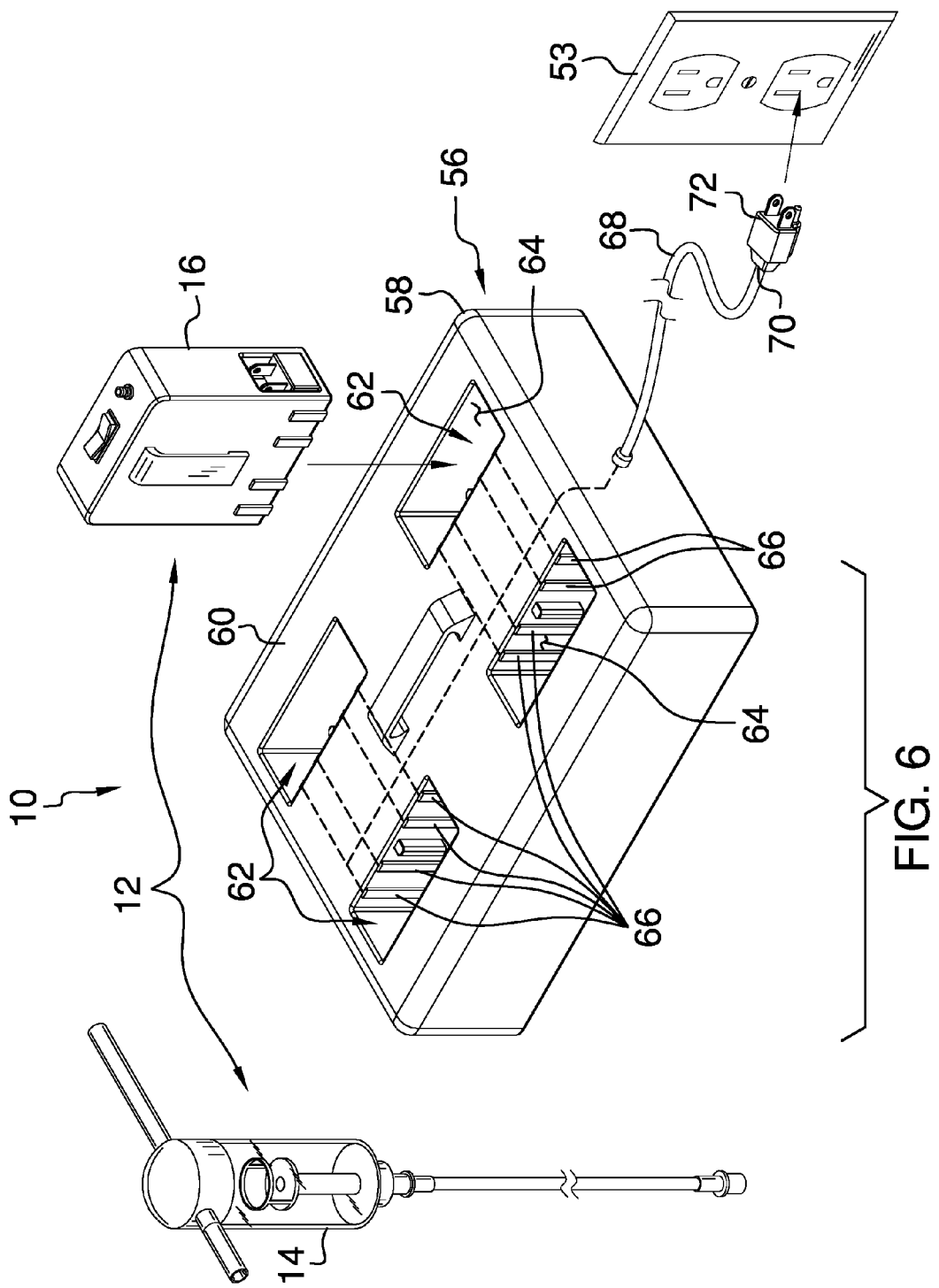
FIG. 6 is a perspective view of charging unit of an embodiment of the disclosure.

With reference now to the drawings, and in particular to FIGS. 1 through 6 thereof, a new nicotine deliver device embodying the principles and concepts of an embodiment of the disclosure and generally designated by the reference numeral 10 will be described.

As best illustrated in FIGS. 1 through 6, the nicotine delivery system 10 generally comprises a nebulizer 12 that includes a canister 14, a compressor 16 and a hose 18 extending between the canister 14 and the compressor 16. The canister 14 contains a liquid 20 and the liquid 20 comprises a nicotine solution. The nicotine solution may be a nicotine solution used in the convention of nicotine nebulizers.

A fogging unit 22 is coupled to the canister 14 and the fogging unit 22 is positioned within the canister 14. The fogging unit 22 converts the liquid 20 into a mist 24. Thus, the mist 24 may be inhaled. The fogging unit 22 may comprise any fogging unit utilized in the convention of nebulizers. Thus, the liquid 20 is converted into an inhalable mist 24 without the use of heat or combustion.

A lid 26 is removably coupled to an open end 28 of the canister 14. The lid 26 has an inhale port 30 and an exhale port 32. Each of the inhale port 30 and the exhale port 32 is in fluidly communication with the canister 14 when the lid 26 is coupled to the open end 28. The inhale port 30 may be sucked thereby facilitating the mist 24 to be inhaled. Each of the inhale port 30 and the exhale port 32 may be structured to resemble a cigarette.

The compressor 16 comprises a housing 34 that has an outer wall 36. The housing 34 includes a clip 38 that is coupled to the outer wall 36. The clip 38 may engage an article of clothing thereby facilitating the compressor 16 to be portable. The outer wall 36 has a lateral side 40 and the lateral side 40 has a recess 42 extending inwardly therein.

An output port 44 is coupled to the outer wall 36. The hose 18 is removably coupled to the output port 44 such that the canister 14 is in fluid communication with the output port 44. A pump 46 is positioned within the housing 34 and the pump 46 is fluidly coupled to the output port 44. The pump 46 urges air outwardly through the output port 44 thereby facilitating the hose 18 to transfer to air into the canister 14.

A switch 48 is coupled to the outer wall 36 and the switch 48 may be manipulated. The switch 48 is electrically coupled to the pump 46 such that the switch 48 turns the pump 46 on and off. A plurality of first contacts 50 is provided and each of the first contacts 50 is coupled to the outer wall 36. The first contacts 50 are spaced apart from each other and distributed along the outer wall 36.

A power plug 52 is rotatably coupled to the outer wall 36 and the power plug 52 is positioned within the recess 42. The power plug 52 is positionable in a deployed position having the power plug 52 extending outwardly from the recess 42. Thus, the power plug 52 may be coupled to a power source 53. The power plug 52 is positionable in a stored position having the power plug 52 being contained within the recess 42. The power plug 52 may comprise a two prong male electrical plug or the like. The power source 53 may comprise an electrical outlet or the like.

A power supply 54 is positioned within the housing 34. The power supply 54 is electrically coupled to the switch 48. The power supply is electrically coupled to each of the first contacts 50 and the power plug 52. The power supply 54 comprises at least one rechargeable battery.

A charging unit 56 is provided and the charging unit 56 comprises a box 58 that has a top wall 60. The top wall 60 has a plurality of wells 62 extending inwardly therein and each of the wells 62 has a lateral bounding surface 64. The wells 62 are spaced apart from each other and distributed on the top wall 60. The compressor 16 is selectively inserted into a selected one of the wells 62.

A plurality of sets of second contacts 66 is provided. Each of the sets of second contacts 66 is coupled to the lateral bounding surface 64 of an associated one of the wells 62. Each of the first contacts 50 is placed in electrical communication with the set of second contacts 66 corresponding to the selected well 62 when the compressor 16 is positioned within the selected well 62. Thus, the charging unit 56 may charge a plurality of compressors 16. Each of the first contacts 50 and each of sets of second contacts 66 are comprised of an electrically conductive material.

A power cord 68 extends outwardly from the box 58 and the power cord 68 is electrically coupled to each of the sets of second contacts 66. The power cord 68 has a distal end 70 with respect to the box 58 and a plug 72 is electrically coupled to the distal end 70. The plug 72 may be electrically coupled to the power source 53. The charging unit 56 charges the power supply 54 in the compressor 16 when the compressor 16 is positioned within the selected well 62.

In use, the lid 26 is removed from the canister 14 and the liquid 20 is poured into the canister 14. The lid 26 is coupled to the canister 14 and the hose 18 is coupled between the canister 14 and the compressor 16. The switch 48 is manipulated and the pump 46 is turned on. The fogging unit 22 converts the liquid 20 into the mist 24. The inhale port 30 is sucked on and the mist 24 is inhaled thereby facilitating the nicotine to be inhaled. The nebulizer 12 is used in a smoke free environment that forbids combustion such as a hospital or the like. The nebulizer 12 facilitates the sensation of smoking a cigarette in a smoke free environment. Additionally, the nebulizer 12 facilitates the inhalation of nicotine without the risk of fire.

With respect to the above description then, it is to be realized that the optimum dimensional relationships for the parts of an embodiment enabled by the disclosure, to include variations in size, materials, shape, form, function and manner of operation, system and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A nicotine delivery system comprising:
a nebulizer including a canister, a compressor and a hose extending between said canister and said compressor, said canister containing a liquid, said liquid comprising a nicotine solution, said canister including a fogging unit, said fogging unit converting said liquid into an mist wherein said mist is configured to be inhaled, said canister having an inhale port and an exhale port, each of said inhale port and said exhale port being fluidly coupled to said canister, said inhale port being configured to be sucked thereby facilitating said mist to be inhaled; and
a charging unit having said compressor being selectively electrically coupled thereto such that said charging unit charges said compressor, said charging unit comprising a box having a top wall, said top wall having a plurality of wells extending inwardly therein, each of said wells having a lateral bounding surface, said wells being spaced apart from each other and distributed on said top wall, said compressor being selectively inserted into a selected one of said wells.

2. The system according to claim 1, wherein said compressor comprises a housing having an outer wall, said housing including a clip being coupled to said outer wall wherein said clip is configured to engage an article of clothing thereby facilitating said compressor to be portable, said outer wall having a lateral side, said lateral side having a recess extending inwardly therein.

3. The system according to claim 2, further comprising:
an output port being coupled to said outer wall, said hose being removably coupled to said output port such that said canister is in fluid communication with said output port; and
a pump being positioned within said housing, said pump being fluidly coupled to said output port wherein said pump is configured to urge air outwardly through said output port thereby facilitating said hose to transfer to air into said canister.

4. The system according to claim 3, further comprising:
a switch being coupled to said outer wall wherein said switch is configured to be manipulated, said switch being electrically coupled to said pump such that said switch turns said pump on and off; and
a plurality of first contacts, each of said first contacts being coupled to said outer wall.

5. The system according to claim 2, further comprising a power plug being rotatably coupled to said outer wall, said power plug being positioned within said recess, said power plug being positionable in a deployed position having said power plug extending outwardly from said recess wherein said power plug is configured to be coupled to a power source, said power plug being positionable in a stored position having said power plug being contained within said recess.

6. The system according to claim 4, further comprising:
a power plug; and
a power supply being positioned within said housing, said power supply being electrically coupled to said switch, each of said first contacts and said power plug, said power supply comprising at least one rechargeable battery.

7. The system according to claim 1, further comprising:
said compressor having a plurality of first contacts; and
a plurality of set of second contacts, each of said sets of second contacts being coupled to said lateral bounding surface of an associated one of said wells, each of said first contacts being placed in electrical communication with said set of second contacts corresponding to a selected one of said wells when said compressor is positioned within said selected well.

8. The system according to claim 7, further comprising:
said compressor having a power supply; and
a power cord extending outwardly from said box, said power cord being electrically coupled to each of said set of second contacts, said power cord having a distal end with respect to said box, said distal end having a plug being electrically coupled thereto, said plug being configured to be electrically coupled to a power source, each said box charging said power supply in said compressor when said compressor is positioned within said selected well.

9. A nicotine delivery system comprising:
a nebulizer including a canister, a compressor and a hose extending between said canister and said compressor, said canister containing a liquid, said liquid comprising a nicotine solution, said canister including a fogging unit, said fogging unit converting said liquid into an mist wherein said mist is configured to be inhaled, said canister having an inhale port and an exhale port, each of said inhale port and said exhale port being fluidly coupled to said canister, said inhale port being configured to be sucked thereby facilitating said mist to be inhaled, said compressor comprising:
  a housing having an outer wall, said housing including a clip being coupled to said outer wall wherein said clip is configured to engage an article of clothing thereby facilitating said compressor to be portable, said outer wall having a lateral side, said lateral side having a recess extending inwardly therein,
  an output port being coupled to said outer wall, said hose being removably coupled to said output port such that said canister is in fluid communication with said output port,
  a pump being positioned within said housing, said pump being fluidly coupled to said output port wherein said pump is configured to urge air outwardly through said output port thereby facilitating said hose to transfer to air into said canister,
  a switch being coupled to said outer wall wherein said switch is configured to be manipulated, said switch being electrically coupled to said pump such that said switch turns said pump on and off,
  a plurality of first contacts, each of said first contacts being coupled to said outer wall,
  a power plug being rotatably coupled to said outer wall, said power plug being positioned within said recess, said power plug being positionable in a deployed position having said power plug extending outwardly from said recess wherein said power plug is configured to be coupled to a power source, said power plug being positionable in a stored position having said power plug being contained within said recess, and
  a power supply being positioned within said housing, said power supply being electrically coupled to said switch, each of said first contacts and said power plug, said power supply comprising at least one rechargeable battery; and
a charging unit having said compressor being selectively electrically coupled thereto such that said charging unit charges said compressor, said charging unit comprising:
  a box having a top wall, said top wall having a plurality of wells extending inwardly therein, each of said wells having a lateral bounding surface, said wells being spaced apart from each other and distributed on said top wall, said compressor being selectively inserted into a selected one of said wells,
  a plurality of set of second contacts, each of said sets of second contacts being coupled to said lateral bounding surface of an associated one of said wells, each of said first contacts being placed in electrical communication with said set of second contacts corresponding to said selected well when said compressor is positioned within said selected well, and
  a power cord extending outwardly from said box, said power cord being electrically coupled to each of said set of second contacts, said power cord having a distal end with respect to said box, said distal end having a plug being electrically coupled thereto, said plug being configured to be electrically coupled to a power source, each said box charging said power supply in said compressor when said compressor is positioned within said selected well.

* * * * *